US010893407B2

(12) United States Patent
Jolibois et al.

(10) Patent No.: US 10,893,407 B2
(45) Date of Patent: Jan. 12, 2021

(54) METHOD FOR CONTROLLING AN EMBEDDED SUBSCRIBER IDENTITY MODULE

(71) Applicant: IDEMIA FRANCE, Colombes (FR)

(72) Inventors: Romuald Jolibois, Colombes (FR); Jérôme Dumoulin, Colombes (FR); Tomasz Wozniak, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 16/064,156

(22) PCT Filed: Dec. 20, 2016

(86) PCT No.: PCT/FR2016/053576
§ 371 (c)(1),
(2) Date: Jun. 20, 2018

(87) PCT Pub. No.: WO2017/109384
PCT Pub. Date: Jun. 29, 2017

(65) Prior Publication Data
US 2019/0007824 A1 Jan. 3, 2019

(30) Foreign Application Priority Data
Dec. 22, 2015 (FR) ...................... 15 63135

(51) Int. Cl.
H04W 8/18 (2009.01)
H04W 4/50 (2018.01)
(Continued)

(52) U.S. Cl.
CPC ............. H04W 8/183 (2013.01); H04W 4/50 (2018.02); H04W 8/20 (2013.01); H04W 88/06 (2013.01)

(58) Field of Classification Search
CPC ....... H04W 8/18; H04W 8/183; H04W 8/186; H04W 4/50; H04W 8/20; H04W 4/60; H04W 88/06
See application file for complete search history.

(56) References Cited

U.S. PATENT DOCUMENTS

2010/0311444 A1* 12/2010 Shi .................... H04W 4/50
455/466
2012/0108206 A1* 5/2012 Haggerty ............ H04W 8/20
455/411
(Continued)

FOREIGN PATENT DOCUMENTS

EP 2 773 077 A1 9/2014
EP 2 884 712 A1 6/2015

OTHER PUBLICATIONS

International Search Report and Written Opinion dated Apr. 11, 2017, International Application No. PCT/FR2016/053576, 11 pages, (English translation of ISR only).

Primary Examiner — Dinh Nguyen
(74) Attorney, Agent, or Firm — MH2 Technology Law Group LLP

(57) ABSTRACT

An embedded subscriber identity module (eUICC1) and a method of controlling such a module. The embedded subscriber identity module (eUICC1) is suitable for maintaining numerous communication profiles (P) simultaneously in the active state, and each active communication profile (P) allows the communications terminal (T) containing the embedded subscriber identity module to communicate with a mobile telephone network (R) associated with that communication profile.

13 Claims, 7 Drawing Sheets

(51) Int. Cl.
  *H04W 8/20* (2009.01)
  *H04W 88/06* (2009.01)

(56) References Cited

U.S. PATENT DOCUMENTS

| | | | |
|---|---|---|---|
| 2013/0023309 A1* | 1/2013 | Holtmanns | H04W 8/245 455/558 |
| 2014/0140507 A1* | 5/2014 | Park | H04W 8/245 380/247 |
| 2015/0189496 A1* | 7/2015 | Park | H04W 8/183 455/418 |
| 2015/0350878 A1 | 12/2015 | Li et al. | |
| 2016/0007190 A1* | 1/2016 | Wane | H04W 12/06 455/419 |

* cited by examiner

| DGI | LENGTH | VALUE | | | | | | | | | | |
|---|---|---|---|---|---|---|---|---|---|---|---|---|
| 3A03 | VAR | ENABLE PROFILE | | | | | | | | | | |
| | | TAG | LENGTH | VALUE | | | | | | | | |
| | | 55 (TAG1) | 01 | LENGTH | MODE | | | | | | | |
| | | | | 01 | 00: ENABLE NEW ISD-P + STAY ACTIVATED ISD-P ALREADY ACTIVATED | | | | | | | |
| | | | | 01 | 01: ENABLE ISD-P REFERENCED + DISABLE ALL OTHERS | | | | | | | |
| | | | | 01 | 02: ENABLE LIST LT1 OF ISD-P + DISABLE LIST LT2 OF ISD-P | | | | | | | |
| | | | | .... | | | | | | | | |
| | | 4F (TAG6) | 5-16 | ISD-P AiD | | | | | | | | |
| | | 56 (TAG2) | VAR | LIST LT1 | | | | | | | | |
| | | | | TAG | LENGTH | VALUE | | | | | | |
| | | | | 4F (TAG8) | 5-16 | ISD-P AiD | | | | | | |
| | | | | ... | ... | ... | | | | | | |
| | | | | 4F | 5-16 | ISD-P AiD | | | | | | |
| | | 57 (TAG4) | VAR | LIST LT2 | | | | | | | | |
| | | | | TAG | LENGTH | VALUE | | | | | | |
| | | | | 4F (TAG10) | 5-16 | ISD-P AiD | | | | | | |
| | | | | ... | ... | ... | | | | | | |
| | | | | 4F | 5-16 | ISD-P AiD | | | | | | |

FIG.8

| DGI | LENGTH | VALUE | | | | | | |
|---|---|---|---|---|---|---|---|---|
| 3A04 | VAR | DISABLE PROFILE | | | | | | |
| | | TAG | LENGTH | VALUE | | | | |
| | | 58 | LENGTH | MODE | | | | |
| | | | 01 | 00: DISABLE ISD-P REFERENCED + STAY ACTIVATED ISD-P ALREADY ACTIVATED | | | | |
| | | | 01 | 01: DISABLE ALL ACTIVATED ISD-P + FALL BACK PROFILE ACTIVATION | | | | |
| | | | 01 | 02: ENABLE LIST LT1 OF ISD-P + DISABLE LIST LT2 OF ISD-P | | | | |
| | | | 01 | .... | | | | |
| | | 4F | 5-16 | ISD-P AiD | | | | |
| | | 56 | VAR | LIST LT1 | | | | |
| | | | | TAG | LENGTH | VALUE | | |
| | | | | 4F | 5-16 | ISD-P AiD | | |
| | | | | ... | ... | ... | | |
| | | | | 4F | 5-16 | ISD-P AiD | | |
| | | 57 | VAR | LIST LT2 | | | | |
| | | | | TAG | LENGTH | VALUE | | |
| | | | | 4F | 5-16 | ISD-P AiD | | |
| | | | | ... | ... | ... | | |
| | | | | 4F | 5-16 | ISD-P AiD | | |

FIG.9

METHOD FOR CONTROLLING AN EMBEDDED SUBSCRIBER IDENTITY MODULE

CROSS-REFERENCE TO RELATED APPLICATIONS

This application is a U.S. National Stage application of International Application No. PCT/FR2016/053576 filed 20 Dec. 2016, which claims priority to French Application No. 1563135 filed 22 Dec. 2015, the entire disclosures of which are hereby incorporated by reference in their entireties.

BACKGROUND OF THE INVENTION

The present invention relates to the field of embedded subscriber identity modules, also known as embedded universal integrated circuit chips (eUICCs), and it relates more particularly to such eUICC modules suitable for appropriately managing a plurality of communication profiles.

In known manner, a conventional SIM card is configured to enable a communications terminal (e.g. such as a cell phone), with which it co-operates, to use the communications network of only one network operator. For this purpose, the SIM card contains subscription data such as, for example: an international mobile subscriber identity (IMSI); cryptographic keys; and algorithms specific to the associated operator. The subscription data is stored permanently in a read only memory (ROM).

When a cell phone attempts to use the services of a cell phone network, it sends all of the subscription data stored in the SIM card that is needed by the network operator in order to obtain access to the required services. The operator can thus identify the user and make use of a home location register (HLR) database to verify that the user has indeed subscribed to the requested service. If so, the operator then allows access to the cell phone having embedded therein the SIM card with the data that was used for authenticating and registering the telephone with the operator network.

Furthermore, reprogrammable SIM cards are now known, and more particularly embedded subscriber identity modules or eUICC modules. These reprogrammable modules enable a user to change operator without needing to physically replace the SIM card in the cell phone. The main specifications for an eUICC module are defined by the global system for mobile communications association (GSMA) in the standard GSMA SGP.02 v3.0 entitled "Remote provisioning architecture for embedded UICC—technical specification—version 3.0" dated Jun. 30, 2015. An eUICC module is a secure hardware element, generally of small size, that can be integrated in a cell phone so as to perform the functions of a traditional SIM card.

In particular, an eUICC module is suitable for containing a plurality of communication profiles (also referred to below just as "profiles"). Each profile is contained in a dedicated secure domain referred to as "ISD-P" in that GSMA standard. When a communication profile is active, it enables the cell phone to access in secure manner the communications network of an associated operator, and also the services that are defined by the profile in question. By changing the communication profile in the eUICC module that is active, it is possible to change operator or to modify access to associated services (e.g. data and/or voice services).

Nevertheless, when an eUICC module has a plurality of communication profiles, it is necessary to deactivate one profile when it is desired to activate another. To do this, the SM-SR server in charge of the life cycle of the profiles loaded within an eUICC module sends requests via the cell phone network, e.g. to activate or deactivate the profile in question in the eUICC. Nevertheless, sending such activation and deactivation requests over the cellular network generates data traffic in the network and loads network resources, which is not always desirable. In more general manner, it is not always desirable to cause an operator to intervene in order to activate or deactivate a profile in a communications terminal.

At present, there exists a need to improve the management of the state of a communication profile in an eUICC module co-operating with a communications terminal.

OBJECT AND SUMMARY OF THE INVENTION

To this end, the present invention provides an embedded subscriber identity module (also referred to as eUICC) suitable for co-operating with a communications terminal, wherein the eUICC module is suitable for maintaining a plurality of communication profiles simultaneously in the active state, each active communication profile allowing the communications terminal to communicate with a mobile telephone network associated with said communication profile.

The invention serves advantageously to improve the management of the (active/inactive) state of networks in an eUICC module, and it serves in particular to maintain a plurality of profiles active simultaneously so that there is no longer any need to send activation and/or deactivation requests to the eUICC module each time it is necessary to use a different profile. It is thus possible to limit network traffic and resources that would normally be necessary for sending and managing profile activation and deactivation requests.

In a particular embodiment, the communications terminal includes at least one radio interface, each active communication profile being suitable, when it has access to said at least one radio interface, for setting up communication between the communications terminal and the mobile telephone network associated with said active communication profile.

In a particular embodiment, the eUICC module is configured, on receiving an activation request to activate a communication profile or on receiving a deactivation request to deactivate a communication profile, to maintain any one other communication profile that is already active in said embedded subscriber identity module.

In a particular embodiment, the eUICC module comprises:
  a receive module suitable for receiving an activation request for activating a first communication profile in the inactive state in the embedded subscriber identity module; and
  a configuration module suitable for configuring the embedded subscriber identity module in a first mode or in a second mode depending on the state of a first parameter included in said activation request;
  wherein, when any second communication profile distinct from said first profile is already active on receiving said activation request, the embedded subscriber identity module is configured:
    in the first mode, to activate the first communication profile while maintaining said second communication profile in the active state; and
    in the second mode, to activate the first communication profile and to deactivate each communication profile other than the first communication profile.

In a particular embodiment, the eUICC module comprises:

a receive module suitable for receiving a deactivation request for deactivating a first communication profile that is already in the active state in the embedded subscriber identity module; and a configuration module suitable for configuring the embedded subscriber identity module in a third mode or in a fourth mode depending on the state of a second parameter included in said deactivation request;

wherein, when any second communication profile distinct from said first profile is already active on receiving said deactivation request, the embedded subscriber identity module is configured:

in the third mode, to deactivate the first communication profile while maintaining the second communication profile active; and in the fourth mode, to activate a communication profile predefined as a profile by default and to deactivate each communication profile other than said profile by default.

In a particular embodiment, in the third mode, the embedded subscriber identity module is configured, in response to the deactivation request, to maintain in the active state the second communication profile including when said second communication profile is not a communication profile defined by default in the eUICC module.

In a particular embodiment, said activation command and/or said deactivation command are APDU commands in compliance with the standard ISO 7816-4.

In a particular embodiment, the eUICC module is suitable, in a fifth mode for receiving a second request identifying at least two communication profiles, each of which is to be activated or deactivated in said eUICC module, said eUICC module being suitable, in said fifth mode:

for configuring to the active state each communication profile identified as a profile for activating in said second request; and for configuring to the inactive state each communication profile identified as a profile for deactivating in said second request.

In a particular embodiment, the second request identifies at least one first communication profile for activating in the embedded subscriber identity module and at least one second communication profile for deactivating in the embedded subscriber identity module.

In a particular embodiment, the second request identifies solely at least two first communication profiles for activating or solely at least two communication profiles for deactivating in the embedded subscriber identity module.

In a particular embodiment, the second request includes a third parameter capable of taking a first state or a second state, and a fourth parameter capable of taking a first state, a second state, or a third state;

wherein the embedded subscriber identity module is configured:

to process the second request as an activation command when the third parameter is in the first state and the fourth parameter is in the first or second state;

to process the second request as a deactivation command when the third parameter is in the second state and the fourth parameter is in the first or second state; and to process the second request as a hybrid activation and deactivation command when the third parameter is in the first or second state and the fourth parameter is in the third state.

In a particular embodiment, the eUICC module is configured to process the second request:

in the first mode if the third parameter is in the first state and the fourth parameter is in the first state;

in the second mode if the third parameter is in the first state and the fourth parameter is in the second state;

in the third mode if the third parameter is in the second state and the fourth parameter is in the first state;

in the fourth mode if the third parameter is in the second state and the fourth parameter is in the second state; and in the fifth mode if the third parameter is in the first state and the fourth parameter is in the third state, or if the third parameter is in the second state and the fourth parameter is in the third state.

In an embodiment, the invention is performed by means of software and/or hardware components. In this context, the term "module" may correspond in this document equally well to a software component, to a hardware component, or to a combination of hardware and software components.

The invention also provides a device (e.g. a profile management server, e.g. of the SM-SR type) suitable for communicating with a communications terminal co-operating with an eUICC module, the device comprising:

a send module suitable for sending to the embedded subscriber identity module an activation request for activating a first communication profile that is in the inactive state in the embedded subscriber identity module or for sending a deactivation request for deactivating a first communication profile that is already in the active state in the embedded subscriber identity module;

an insertion module suitable for including, prior to sending to the embedded subscriber identity module, one of the following:

a first parameter in the activation request; and a second parameter in the deactivation request;

wherein:

the first parameter is in a state defining whether the embedded subscriber identity module is to configure itself in a first mode or in a second mode when any second communication profile distinct from said first profile is already active in the embedded subscriber identity module on receiving said activation request, the state of the first parameter concerning the embedded subscriber identity module:

in the first mode, to activate the first communication profile while maintaining said second communication profile active; and in the second mode, to activate the first communication profile and to deactivate each communication profile other than the first communication profile;

the second parameter is in a state defining whether the embedded subscriber identity module is to configure itself in a third mode or in a fourth mode when any second communication profile distinct from said first profile is already active on receiving said deactivation request, the state of the second parameter concerning the embedded subscriber identity module:

in the third mode, to activate the first communication profile while maintaining said second communication profile active; and in the fourth mode, to activate a communication profile predefined as profile by default and to deactivate each communication profile other than said profile by default.

The various embodiments defined above with reference to the eUICC module apply analogously to the device of the invention.

The invention also provides a system comprising:
an eUICC module as defined above;
a communications terminal co-operating with the eUICC module; and
at least one device as defined above.

Correspondingly, the invention provides a control method performed by an embedded subscriber identity module (eUICC) suitable for co-operating with a communications terminal, said method comprising a step of maintaining a plurality of communication profiles simultaneously in the active state, each active communication profile authorizing the communications terminal to communicate with a mobile telephone network associated with said communication profile.

The invention also provides a sending method performed by a device as defined above for sending a command to an eUICC module.

In a particular embodiment, the various steps of the control method and of the sending method are determined by computer program instructions.

Consequently, the invention also provides a computer program on a data medium (or recording medium), the program being suitable for being performed in an embedded subscriber identity module, in a device, or more generally in a computer, the program including instructions adapted to performing steps of a control method or of a sending method as defined above.

The program can use any programming language and be in the form of source code, object code, or code intermediate between source code and object code, such as in a partially compiled form, or in any other desirable form.

The invention also provides a data medium (or recording medium) that is readable by a computer, and that includes instructions of a computer program as mentioned above.

The data medium may be any entity or device capable of storing the program. For example, the medium may comprise storage means, such as a ROM, e.g. a compact disk (CD) ROM, or a microelectronic circuit ROM, a flash type memory, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description given below with reference to the accompanying drawings, which show embodiments having no limiting character. In the figures:

FIG. 8 is a diagram of commands that might be sent by a profile management server to an embedded subscriber identity module in accordance with a particular implementation of the invention; and FIG. 9 is a diagram of commands that might be sent by a profile management server to an embedded subscriber identity module in accordance with a particular implementation of the invention.

DETAILED DESCRIPTION OF EMBODIMENTS

Figure 1:
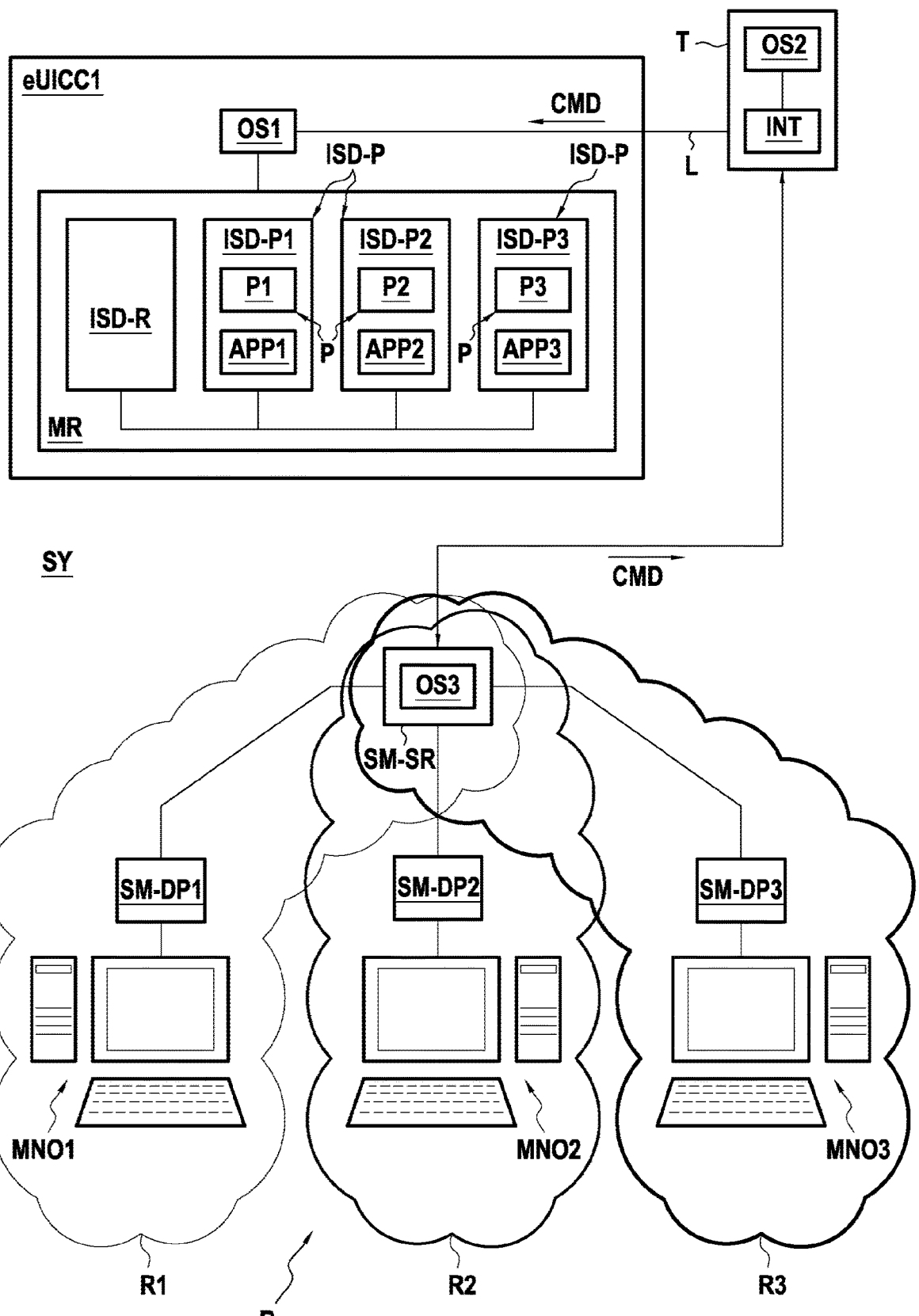
FIG. 1 is a diagram of a system including an embedded subscriber identity module and a profile management server, in a particular embodiment of the invention.

As mentioned above, the invention relates to embedded subscriber identity modules (also known as eUICC modules) and it relates more particularly to using such modules for managing a plurality of communication profiles simultaneously in co-operation with a communications terminal.

Nowadays, the standard GSMA SGP.02 v3.0 (referred to below as the "GSMA standard") imposes a constraint in that only one profile at a time can be in the active state in an eUICC module. In other words, the GSMA standard prohibits the situation in which a plurality of communication profiles are active simultaneously in an eUICC module.

In conventional eUICC modules, the fact that only one profile can be active at any given instant has the consequence that it is not possible to use a plurality of mobile telephone subscriptions simultaneously, as is possible by way of example in a DUAL SIM telephone that uses two distinct SIM cards simultaneously.

In order to use a plurality of subscriptions simultaneously in a single communications terminal, one solution might consist in integrating a plurality of eUICC modules in that communications terminal. Nevertheless, such an approach presents major constraints, in particular in terms of cost and fabrication.

In order specifically to solve the above-mentioned problems and improve the management of communication profiles in an eUICC module, the present invention proposes configuring an eUICC module in such a manner as to enable it to maintain a plurality of communication profiles in the active state at the same time.

A profile is said herein to be "active", or in the "active" state, when a communication profile is activated in the eUICC module so as to allow the communications terminal (with which the eUICC module is co-operating) to communicate with the telephone network associated with the profile in question. In accordance with the GSMA standard, a profile (or the secure domain ISD-P in which it is contained) is said to be "active" (ENABLE) when its so-called "life cycle" state parameter is set to the state '3F'. According to the GSMA standard, a profile is said on the contrary to be "inactive" (DISABLE) when its "life cycle state parameter is set to the '1F' state.

As explained in greater detail below, a communication profile may be active, but without having access to the radio interface of the communications terminal. Under certain circumstances, access to the radio interface may be limited, in particular when there are not as many radio interfaces in the communications terminal as there are profiles that are active at the same time in the eUICC module. An active profile does not enable communication to be set up between the communications terminal and the mobile telephone network associated with the profile unless the profile has access to the radio resource of the communications terminal.

Unless specified to the contrary, elements that are common or analogous in a plurality of figures are given the same reference signs and present characteristics that are identical or analogous, such that these common elements are generally not described again, for reasons of simplicity.

FIG. 1 is a diagram showing the structure of an eUICC module (in this example referenced eUICC1) suitable for co-operating with a communications terminal T in order to enable access to a mobile telephone network R. By way of example, the module eUICC1 is soldered or integrated in the terminal T.

In the presently-described embodiment, the terminal T is a mobile terminal such as a cell phone, for example, but other implementations can nevertheless be envisaged within the context of the invention.

In the presently-described embodiment, the mobile terminal T may use the module eUICC1 to access in secure manner the networks R1, R2 and R3 (referred to collectively as R), and also the services provided by the respective associated network operators MNO1, MNO2, and MNO3 (referred to collectively as MNO for "mobile network operator").

In this particular embodiment, the mobile terminal T has an operating system OS2 suitable in particular for controlling a radio interface INT. The radio interface INT of the terminal T is suitable for transmitting and receiving radio communications with the outside, e.g. via an antenna (not shown).

Figure 2A:
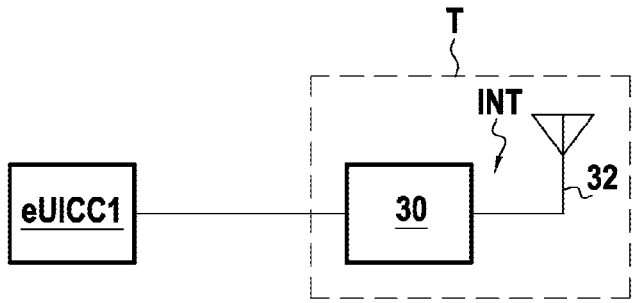
FIG. 2A is a diagram showing an embodiment of the terminal.

By way of example, and as shown in FIG. 2A, the radio interface INT comprises in known manner a radio transceiver unit 30 coupled to an antenna 32. As explained below with reference to FIG. 2B, it is also possible to envisage a plurality of radio interfaces being present in the terminal T.

In the presently-described embodiment, the module eUICC1 has an operating system OS1 (stored in a non-volatile memory, a ROM, or a flash memory, for example) that is coupled to a rewritable non-volatile memory MR.

The operating system OS1 has a certain number of modules that are described in greater detail below with reference to FIG. 3.

The operating system OS1 constitutes an example of a computer program in the meaning of the invention, the program including instructions for executing steps of a control method in a particular embodiment of the invention. The memory in which the operating system OS1 is contained thus constitutes an example of a data medium in the meaning of the invention that is readable by a processor (not shown) of the module eUICC1.

As shown in FIG. 1, the non-volatile memory MR of the module eUICC1 also includes a privileged secure domain ISD-R, together with a plurality of secondary secure domains ISD-P that are referenced ISD-P1, ISD-P2, and ISD-P3 in this example. Each secure domain ISD-P constitutes a secure compartment of the module eUICC1. It can be understood that the presently-envisaged particular embodiment constitutes merely a non-limiting example of the invention, and in particular the number of domains ISD-P may be adapted depending on usage circumstances.

The secure domain ISD-R is privileged, in particular, in that it is capable of creating, deleting, activating, or deactivating secondary secure domains ISD-P in the non-volatile memory MR. In the example embodiments described below, it is the secure domain ISD-R that manages the active or inactive state of the communication profiles of the module eUICC1.

Each secondary secure domain ISD-P is suitable for containing a single communication profile P (or operational profile) associated with a particular network operator MNO. Each profile P is thus contained in a secure domain ISD-P that is dedicated thereto. In known manner, a communication profile P includes subscription data (e.g. identifiers (IMSI, etc.), cryptographic keys, algorithms (e.g. for authentication) . . . ) and may also include a file system, applications, and/or predetermined execution rules. In the presently-envisaged example, the profiles P comply with the GSMA standard.

In the presently-described example, and as shown in FIG. 1, it is assumed that the memory MR of the module eUICC1 has three secondary secure domains referenced ISD-P1, ISD-P2, and ISD-P3, these secondary secure domains containing respective single profiles P1, P2, and P3, each of which may be in the active state or in the inactive state.

When active, the profile P1 (or P2) allows the terminal T to communicate with a mobile network R1 (or R2) associated with the network operator MNO1 (or MNO2). The secure domain ISD-P1 (or ISD-P2) may also contain applications APP1 (or APP2) specific to the operator MNO1 (or MNO2) to which the user has subscribed. Alternatively, the applications APP1 (or APP2) defined by the profile P1 (or P2) may be contained in the profile P1 (or P2) itself.

In this example, and in certain circumstances (as described in detail below), the profile P3 contained in the secondary secure domain ISD-P3 is processed by the module eUICC1 as the profile that is predefined by default in the sense that this profile is activated automatically by default on receiving a request for deactivating another active profile in the eUICC module.

Like the profiles P1 and P2, when it is active, the profile P3 allows the terminal T to communicate with a mobile network R3 associated with a network operator MNO3. The secure domain ISD-P3 may likewise include applications APP3 specific to the operator MNO3 and to which the user has subscribed. Alternatively, the applications APP3 defined for the profile P3 may be contained in the profile P3 itself.

In accordance with the invention, the module eUICC1 is suitable for maintaining a plurality of communication profiles P in the active state at the same time.

The module eUICC1 is also suitable for acting via the terminal T (and in particular its radio interface INT) to communicate in secure manner with a profile management server, which in this example is a subscription manager and secure routing (SM-SR) server. In this example, the SM-SR profile management server belongs to each of the networks R1, R2, and R3.

By way of example, communication between the module eUICC1 and the terminal T may be performed over a connection L in compliance with the standard ISO 7816 (more particularly in accordance with ISO 7816-3 and ISO 7816-4).

In this particular embodiment, the SM-SR server enables each operator MNO to control the (active or inactive) state of the profile P in its charge in the module eUICC1. In this example it is assumed that each of the operators MNO1, MNO2, and MNO3 is suitable for controlling the SM-SR server so that it activates or deactivates the profiles P1, P2, and P3, respectively. For this purpose, the SM-SR server is suitable for sending a command CMD for activating or deactivating the terminal T, which command has the module eUICC1 at its destination. These commands may for example be of the APDU type in accordance with the standard ISO 7816-4.

In the presently-considered example, the SM-SR server runs an operating system OS3 stored on a data medium (not shown).

The module eUICC1 is suitable for receiving the activation or deactivation commands CMD coming from the remote SM-SR server and for directing them to the privileged secure domain ISD-R. In response to a command CMD, the privileged secure domain ISD-R is configured to activate or deactivate at least one profile P in the module eUICC1.

The module eUICC1, the terminal T, and the SM-SR profile management server together forms a system SY.

It can be understood that certain elements generally present in an eUICC module in a communications terminal T or indeed in a server SM-SR, are voluntarily omitted since they are not necessary for understanding the present invention. In addition, the person skilled in the art understands that certain elements are described herein to facilitate understanding the invention even though they are not essential or directly involved in performing the invention.

As mentioned above with reference to FIG. 2A, the terminal T may have a single radio interface INT. Under such circumstances, only one of the profiles P that are active in the module eUICC1 is capable at any given instant of setting up communication between the terminal T and the mobile network R. Under such circumstances, when at least two of the profiles P1, P2, and P3 are active at the same time, only one of the two profiles P can establish communication with the network of the associated operator MNO.

Figure 2B:
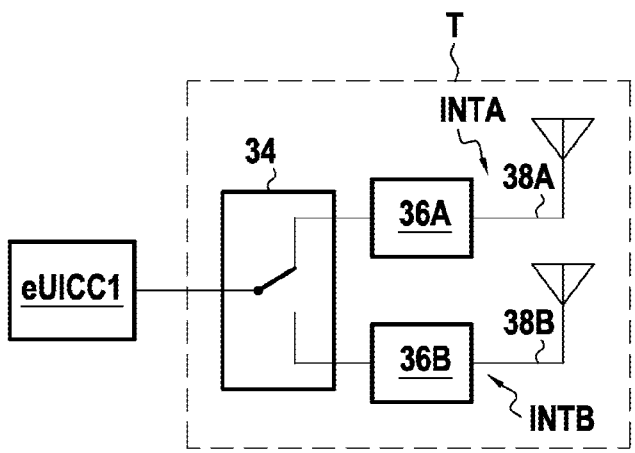
FIG. 2B is a diagram showing an embodiment of the terminal.

Nevertheless, it is possible to envisage including a plurality of radio interfaces INT in the terminal T. FIG. 2B shows an example of an embodiment in which the terminal T has a switch 34 suitable for switching communications between the module eUICC1 and two radio interfaces INTA and INTB of the terminal T. The radio interface INTA (or INTB) in this example comprises a radio transceiver unit 36A (or 36B) coupled to an antenna 38A (or 38B). In this embodiment, the switch 34 can direct each command CMD received by one of the radio interfaces INTA, INTB to the module eUICC1. When a channel between the module eUICC1 and one of the radio interfaces INTA, INTB is in use, the other channel between the module eUICC1 and the other radio interface is not available. Other implementations of the invention can nevertheless be envisaged.

As mentioned above, a communication profile P that is active in the module eUICC1 is not suitable for setting up communication between the terminal T and an associated mobile network R unless the profile P has access to the radio resources of the terminal T (i.e. the radio interfaces).

In a particular embodiment, the terminal T is suitable for time multiplexing data that is sent or received by the various profiles P in the module eUICC1.

In the presently-described embodiment, the communications terminal T has at least one radio interface INT with each communication profile P that is active in the module eUICC1 being suitable, when it has access to said at least one radio interface INT, for setting up communication between the terminal T and the mobile telephone network R associated with the active communication profile P.

In accordance with the invention, the module eUICC1 is suitable for maintaining simultaneously in the active state a plurality of communication profiles P from among the profiles P1, P2, and P3 in this example. As can be seen from the description below, various configurations of the module eUICC1 can be envisaged in the ambit of the invention.

In the presently-described embodiment, the module eUICC1 is configured, on receiving a request CMD either to activate a profile P or else to deactivate a profile P, to maintain in the active state any other profile P that is already active in the module eUICC1. By way of example, if a first profile P is active in the module eUICC1 on receiving a request CMD to activate a second profile P (distinct from the first profile), the module eUICC1 is configured to activate the second profile and to maintain the first profile active, whatever that profile may be.

Likewise, by way of example, if both a first and a second profile P are active on receiving a request CMD to deactivate the first profile P, the module eUICC1 is configured to deactivate the first profile P while maintaining the active state for the second profile P, whatever that profile may be (i.e. even if the second profile P is not the profile P3 predefined by default).

Figure 3:
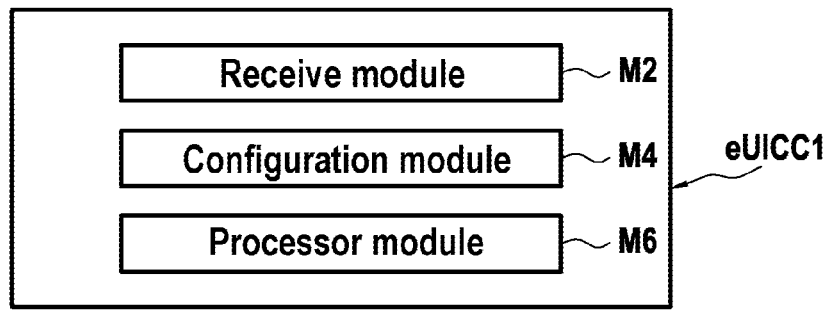
FIG. 3 is a diagram showing modules implemented in the embedded subscriber identity module of FIG. 1, in accordance with a particular embodiment of the invention.

As shown in FIG. 3, the operating system OS1 of the module eUICC1 in this example deploys a certain number of modules, namely: a receive module M2, a configuration module M4, and a processor module M6. In the presently-considered embodiment, these modules M2, M4, and M6 are executed by the secure domain ISD-R of the module eUICC1. More precisely, as described below, the secure domain ISD-R is configured to control the (active or inactive) states of the profiles P of the module eUICC1. The states of the profiles P1-P3 are managed by the secure domain ISD-R in response to one or more commands it receives from the terminal T.

The receive module M2 is suitable for receiving a profile management request CMD coming from the SM-SR server. As mentioned above, it may be a request to activate or a request to deactivate a given profile P in the module eUICC1. As explained below, other types of command CMD may be envisaged in the ambit of the invention.

The configuration module M4 is suitable for configuring the module eUICC1 with various operating modes, depending on the usage circumstances under consideration.

In response to an activation or deactivation command CMD, the processor module M6 is suitable for managing the (active or inactive) states of the profiles P in the module eUICC1, and to do in compliance with the mode of operation in which the configuration module M4 has configured the module eUICC1.

It can be understood that the above definition of the modules M2 to M6 merely constitutes a non-limiting embodiment of the invention. At least two of these modules may in particular form a single module deployed in the module eUICC1.

Figure 4:
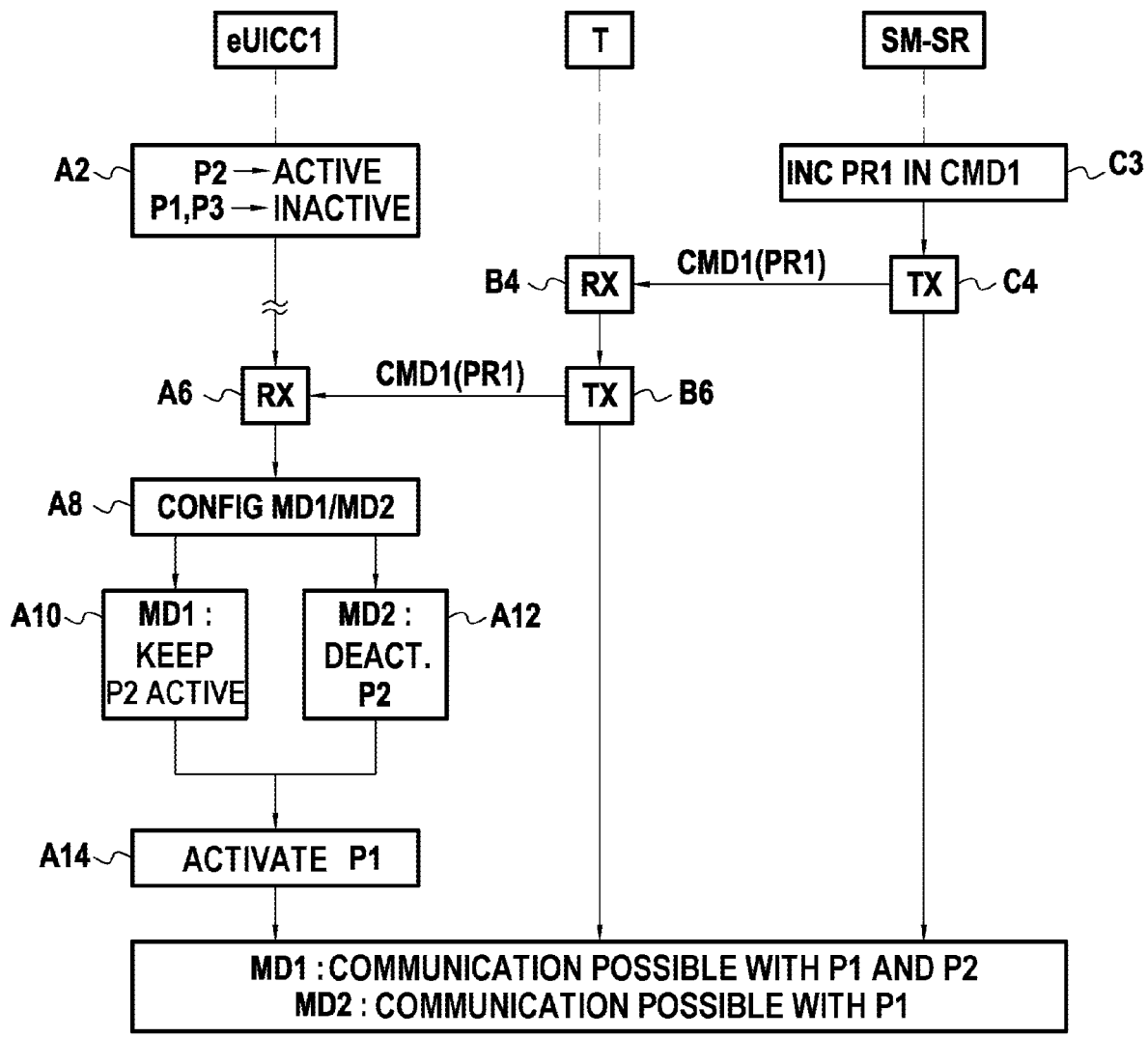
FIG. 4 is a flow chart showing the steps of a control method and a sending method in accordance with a particular implementation of the invention.

A particular embodiment of the invention, performed by the module eUICC1 and by the SM-SR profile management server is described below with reference to the flow chart of FIG. 4. For this purpose, the module eUICC1 executes the operating system OS1 to perform a control method in a particular implementation, and the SM-SR profile management server executes the operating system OS3 to perform a sending method in a particular implementation.

It is assumed at this point that the profile P2 is active and that the profiles P1 and P3 are inactive in the module eUICC1 (A2).

During an inclusion step C3, the SM-SR server generates a command (or request) CMD1 for activating the profile P1 and includes in the command CMD1 a parameter PR1 specifying the mode of operation with which said command CMD1 is to be processed by the module eUICC1.

During a sending step C4, the SM-SR profile management server sends the command CMD1 to the terminal T.

Once received (B4), the terminal T sends (B6) the command CMD1 to the module eUICC1.

The module eUICC1 receives the command CMD1 during a receive step A6.

The module eUICC1 then configures itself (A8) in a mode of operation, said mode being a function of the parameter PR1 included in the receive command CMD1. More particularly, the configuration module M4 configures the module eUICC1 in a first mode MD1 or in a second mode MD2 depending on the state of the parameter PR1. In a variant, the parameter PR1 is received separately from the command CMD1.

If, during the step A8, the module eUICC1 configures itself in the first mode MD1 in order to process the command CMD1 for activating the profile P1, then the method continues with steps A10 and A14. More particularly, in this mode MD1, in response to the activation command CMD1, the module eUICC1 (and more particularly the processor module M6) maintains (A10) in the active state the profile P2 that was already active on receiving the command CMD1, and it activates (A14) the profile P1.

In contrast, if, during the step A8, the module eUICC1 configures itself in the second mode MD2 for processing the command CMD1 for activating the profile P1, then the method continues with the steps A12 and A14. More particularly, in this second mode MD2, in response to the command CMD1, the module eUICC1 (and more particularly the processor module M6) deactivates (A12) the profile P2 and activates (A14) the profile P1. In other words, in the second mode MD2, the module eUICC1 responds to a request to activate a first profile P by activating said first profile P and deactivating each profile other than the first profile P.

In this example, at the end of processing the command CMD1 in the first mode MD1, the profiles P1 and P2 allow the terminal T to communicate with the mobile networks R1 and R2 respectively.

At the end of processing the command CMD1 in the second mode MD2, only the profile P1 allows the terminal T of communicate with the mobile network R1.

In other words, in the second mode MD2, the module eUICC1 processes the command CMD1 for activating the profile P1 in conventional manner, with it being possible for only one profile to be active at a time in the eUICC module. In contrast, in the first mode MD1, the module eUICC1 processes the activation command CMD1 in application of the principle of the invention so that a plurality of profiles P can be active simultaneously in the module eUICC1.

Use of the parameter PR1 serves advantageously to control the manner in which the states of profiles are managed in an eUICC module in response to a request to activate one of the profiles of the eUICC module.

Figure 5:
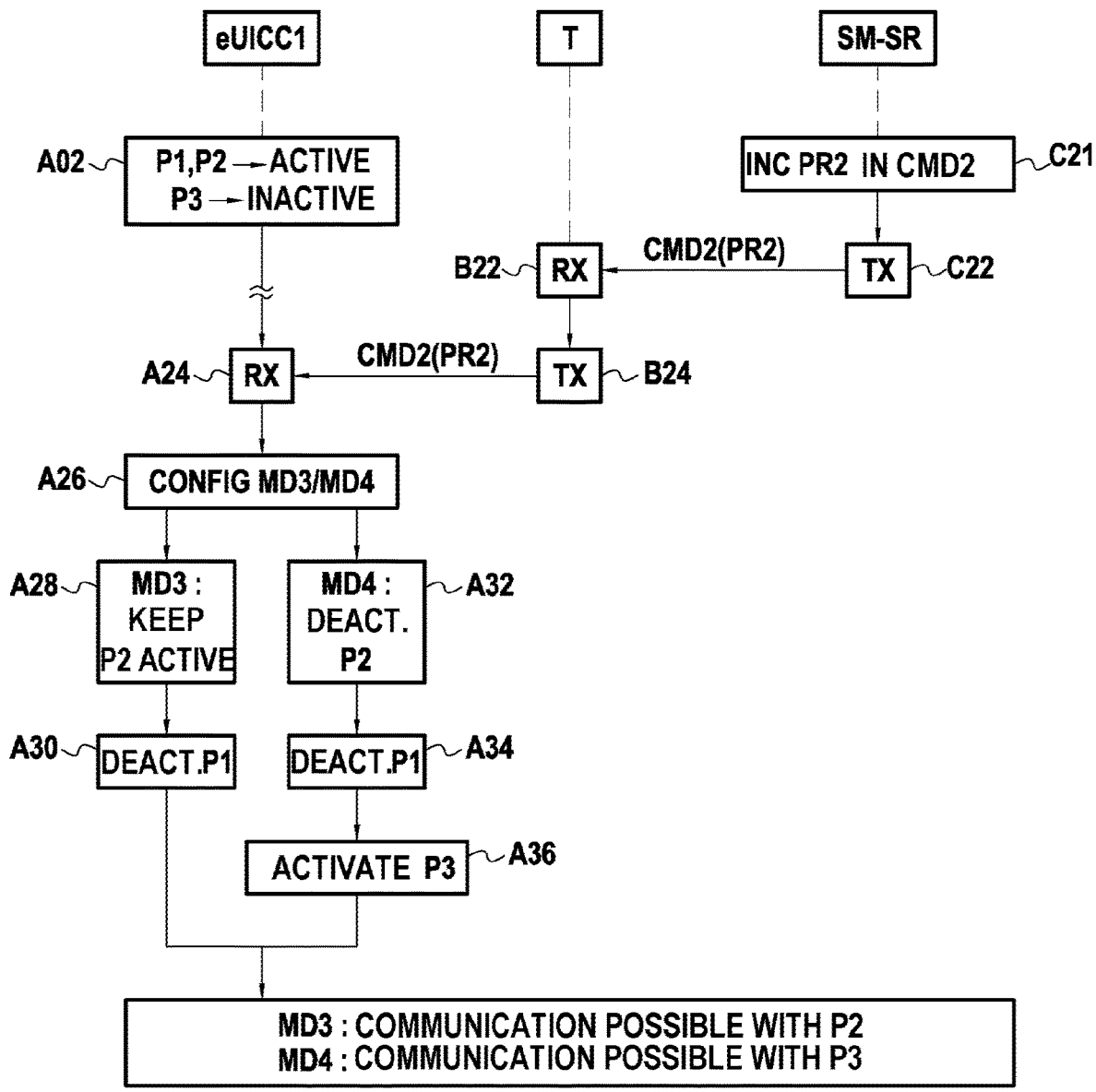
FIG. 5 is a flow chart showing the steps of a control method and a sending method in accordance with a particular implementation of the invention.

A particular implementation of the invention, performed by the module eUICC1 and by the SM-SR profile management server is described below with reference to the flow chart of FIG. 5. For this purpose, the module eUICC1 executes the operating system OS1 in order to perform a control method in a particular implementation, and the SM-SR profile management server executes the operating system OS3 in order to perform a sending method in a particular implementation.

In this example, it is assumed that the profiles P1 and P2 are active and that the profile P3 is inactive in the module eUICC1 (A20).

During an inclusion step C21, the SM-SR server generates a command (or request) CMD2 for deactivating the profile P1 and includes in the command CMD2 a parameter PR2 indicating which mode of operation should be used for processing said command CMD2 by the module eUICC1.

During a sending step C22, the SM-SR profile management server sends the command CMD2 to the terminal T.

Once received (B22), the terminal T sends (B24) the command CMD2 to the module eUICC1.

The module eUICC1 receives the command CMD2 during a receiving step A24.

The module eUICC1 then configures itself (A26) in a mode of operation, said mode being a function of the parameter PR2 included in the receive command CMD2. More particularly, the configuration module M4 configures the module eUICC1 in a third mode MD3 or in a fourth mode MD4 depending on the state of the parameter PR2. In a variant, the parameter PR2 is received separately from the command CMD2.

If, during step A26, the module eUICC1 configures itself in the third mode MD3 in order to process the command CMD2 for deactivating the profile P1, then the control method continues with steps A28 and A30. More particularly, in this third mode MD3, in response to the deactivation command CMD2, the module eUICC1 (and more particularly to processor module M6) maintains (A28) the profile P2 in the active state, regardless of which profile P2 is concerned (even if the profile P2 is not a profile that is predefined as a default profile in the module eUICC1), and it deactivates (A30) the profile P1.

In a particular example, in the third mode MD3, in response to the deactivation command CMD2, the module eUICC1 also maintains in the inactive state the profile P3 that is predefined by default.

In contrast, in step A26, if the module eUICC1 configures itself in the fourth mode MD4 for processing the command CMD2 for deactivating the profile P1, then the control method continues with steps A32, A32, and A36. More particularly, in this fourth mode MD4, in response to the deactivation command CMD2, the module eUICC1 (and more particularly the processor module M6) deactivates (A32) the profile P2, deactivates (A34) the profile P1, and activates (A36) the profile P3 as the profile predefined by default. In other words in this fourth mode MD4, in response to a request to deactivate a first profile P, the module eUICC1 activates the profile that is predefined as the profile by default in the module eUICC1, and it deactivates every profile other than said profile that is predefined by default.

In this example, at the end of processing the deactivation command CMD2 in the third mode MD3, only the profile P2 allows the terminal T to communicate with the mobile network R2.

At the end of processing the deactivation command CMD2 in the fourth mode MD4, only the profile P3 allows the terminal T to communicate, and to do so with the mobile network R3.

In other words, in the fourth mode MD4, the module eUICC1 processes the command CMD2 for deactivating the profile P1 in conventional manner. In contrast, in the third mode MD3, the module eUICC1 processes the deactivation command CMD2 on the principle of the invention so that a plurality of profiles P can be active simultaneously in the module eUICC1. In the mode MD3, deactivating a profile does not necessarily cause a profile that is predefined by default in the module eUICC to be activated, as happens in conventional eUICC modules.

Use of the parameter PR2 serves advantageously to control the manner in which the states of the profiles are managed in the eUICC module in response to a request to deactivate one of the profiles of the eUICC module.

The above-mentioned commands CMD1 and CMD2 may for example be APDU commands in compliance with the standard ISO 7816-4.

As mentioned above, various implementations can be envisaged in the ambit of the invention.

In the implementations described above with reference to FIGS. 4 and 5, the SM-SR profile management server (shown in FIG. 1), controlled by a computer program stored in a non-volatile memory of said SM-SR server, may for example deploy the following modules:
- a send module suitable for sending to the module eUICC1 the activation request CMD1 and/or for sending the deactivation request CMD2; and
- an insertion module suitable for including, prior to sending to the module eUICC1, at least one of the following:
    - the first parameter PR1 in the activation request CMD1; and
    - the second parameter PR2 in the deactivation request;
- wherein the parameter PR1 is in a state defining whether the module eUICC1 is to configure itself in the first mode MD1 or in the second mode MD2 in order to process the activation command CMD1; and
- wherein the parameter PR2 is in a state defining whether the module eUICC1 is to configure itself in the third mode MD1 or in the fourth mode MD4 in order to process the deactivation command CMD2.

A particular implementation is described below with reference to FIGS. 6 and 7. In this implementation, the module eUICC1 is once more suitable for maintaining a plurality of communication profiles P simultaneously in the active state, each active profile P allowing the communications terminal T to communicate with a respective mobile telephone network R associated with said communication profile. In contrast, the module eUICC1 is configured to manage the states of the profile P in the module eUICC1 in a manner that is different from that described above with reference to the implementations shown in FIGS. 4 and 5.

Figure 6:
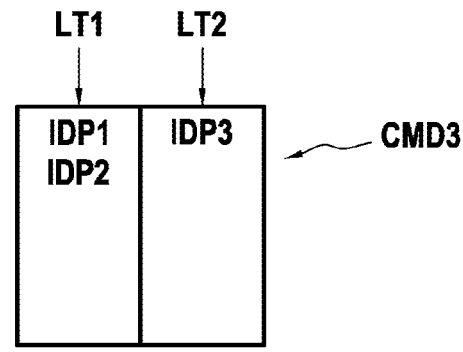
FIG. 6 is a diagram showing a command that may be sent by a profile management server to an embedded subscriber identity module, in a particular implementation of the invention.
Figure 7:
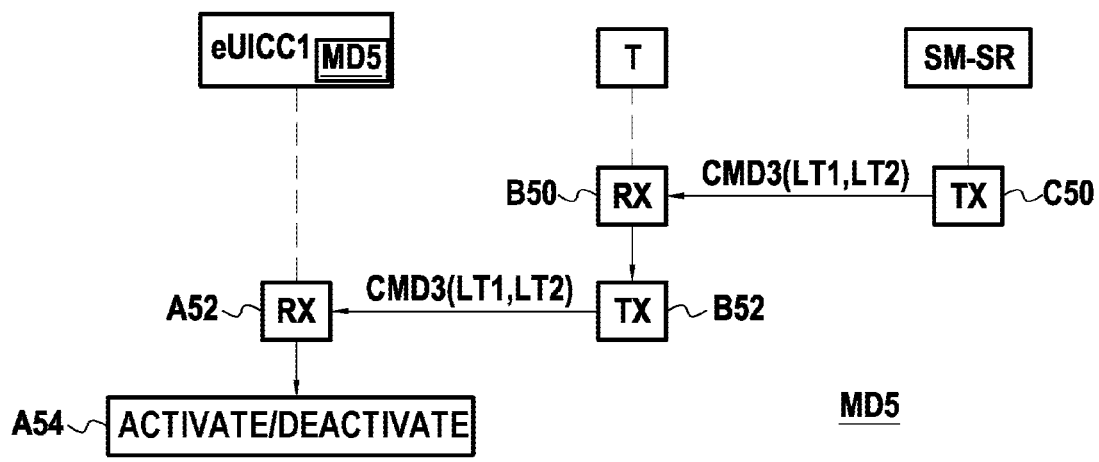
FIG. 7 is a flow chart showing steps of a control method and a sending method in accordance with a particular implementation of the invention.

In the implementation shown in FIGS. 6 and 7, the SM-SR profile management server is configured to send a so-called "hybrid" command (or request) CMD3 to the module eUICC1 via the terminal T. The hybrid command CMD3 identifies at least two profiles P, each of which is to be activated or deactivated in the eUICC module concerned. In other words, the hybrid command CMD3 commands activation or deactivation in the destination eUICC module of each of at least two communication profiles P.

In this implementation, it is assumed that the module eUICC1 is operating in a fifth mode MD5. In this fifth mode MD5, the module eUICC1 is suitable:
- for configuring in the active state each communication profile P identified in the hybrid command CMD3 as being a profile for activating; and
- for configuring in the inactive state each communication profile P identified in the hybrid command CMD3 as being a profile for deactivating.

By way of example, and as shown in FIG. 6, the command CMD3 contains a first list LT1 identifying at least one profile P for activating, and a second list LT2 identifying at least one profile P for deactivating. Where appropriate, one of these lists LT1 and LT2 may be empty.

In the example shown in FIG. 6, the list LT1 contains the identifiers IDP1 and IDP2 of the profiles P1 and P2 respectively. Furthermore, the list LT2 contains the identifier IDP3 of the profile P3. Thus, in this particular example, in response to the hybrid command CMD3, the module eUICC1 activates the profiles P1 and P2, and deactivates the profile P3.

This implementation serves advantageously to control simultaneously activation or deactivation of each of a plurality of profiles P in an eUICC module. It is thus possible with a single command to request a more or less complex configuration for the states of the profiles in an eUICC module.

In a particular example, the hybrid command CMD3 identifies at least a first profile P for activating in the module eUICC1 and at least one second profile P for deactivating in the module eUICC1. In other words, the command CMD3 in this example is both an activation command and a deactivation command, thus making it possible advantageously to command in simultaneous manner a specific configuration for the states of the profiles to be deployed in an eUICC module.

In a particular example, the hybrid command CMD3 identifies only at least two profiles P for activating (i.e. at least two profiles P for activating, and no profile P for deactivating). Under such circumstances, the command CMD3 is exclusively an activation command in the sense that it does not command deactivation of any profile.

In a particular example, the hybrid command CMD3 identifies solely at least two profiles P for deactivating (i.e. at least two profiles P for deactivating and no profile P for activating). Under such circumstances, command CMD3 is exclusively a deactivation command in the sense that it does not command activation of any profile.

With reference to FIGS. 6 and 7, there follows a description of a control method performed by the module eUICC1 and a sending method performed by the SM-SR profile management server, in a particular implementation.

During a step C50, the SM-SR server sends to the terminal T a hybrid command CMD3 having the module eUICC1 as its destination, this command CMD3 including the identifiers IDP1 and IDP2 of respective profiles P1 and P2 in the list LT1, and the identifier IDP3 of the profile P3 in the list LT2.

On reception (B50), the terminal T sends (B52) the command CMD3 containing the lists LT1 and LT2 to the module eUICC1.

The module eUICC1 receives the command CMD3 during a reception step A52.

The module eUICC1 configures (A54) the state of the communication profiles P on the basis of the command CMD3, and more particularly on the basis of the profiles P identified in the command CMD3 as profiles for activating and/or as profiles for deactivating. As mentioned above, it is assumed that the module eUICC1 operates in this example in a fifth mode MD5. In the present example, in the mode MD5, the module eUICC1:
- configures to the active state each communication profile P identified in the hybrid command CMD3 as a profile for activating (i.e. the profiles P1 and P2); and configures to the inactive state each communication profile P identified in the hybrid command CMD3 as a profile for deactivating (i.e. the profile P3).

It is also possible to envisage performing the invention in any combination of the above-described implementations and variants.

A particular implement is described below with reference to FIGS. 8 and 9. In this implementation, the SM-SR profile management server is suitable for sending to the terminal, and having as its destination the module eUICC1, a command CMD4 and/or CMD5 comprising:

- a first parameter DGI that may take a first state (or value) "ENABLE PROFILE" (e.g. 3A03) or a second state "DISABLE PROFILE" (e.g. 3A04); and
- a second parameter TAG1 (e.g. potentially being represented by the value "55" or "58") identifying a mode, which by way of non-limiting example may take on a first state (or value), namely "00", a second state "01" or a third state "02".

In these implementations, the commands CMD4 and CMD5 are of the type-length-value (TLV) type, it being possible to envisage other command formats in the ambit of the invention.

More particularly, FIGS. 8 and 9 show respectively a command CMD4 and a command CMD5 that may be sent to the terminal T by the SM-SR server, each of these commands being capable of commanding the (active or inactive) configuration of the state of at least one profile P in the module eUICC1 in a given mode of operation.

In this implementation, the module eUICC1 is configured to:

- process the command (CMD4) as an activation command if the parameter DGI is in the ENABLE PROFILE first state and the parameter TAG1 is in the first or second state (00, 01);
- process the command (CMD5) as a deactivation command if the parameter DGI is in the DISABLE PROFILE second state and the parameter TAG1 is in the first or second state (00, 01); and
- process the commands (CMD4 and CMD5) as respective hybrid activation and deactivation commands if:
  - the parameter DGI is in the "ENABLE VALUE" first state and the parameter TAG1 is in the third state 02; and if
  - the parameter DGI is in the "DISABLE VALUE" second state and the parameter TAG1 is in the third state 02.

As shown in FIG. 8, the command CMD4 includes the parameter DGI in the ENABLE PROFILE state indicating that the command CMD4 needs to be processed as an activation (or hybrid) command, and the parameter TAG1 indicating the mode of operation with which the command CMD4 is to be processed by the module eUICC1.

In response to the command CMD4, the module eUICC1 is configured to:

- process the command CMD4 as an activation command in the first mode MD1 as described above with reference to FIG. 4 if the parameter TAG1 has the value 00;
- process the command CMD4 as an activation command in the second mode MD2 as described above with reference to FIG. 4 if the parameter TAG1 has the value 01; and
- process the command CMD4 as a hybrid command in the fifth mode MD5 as described above with reference to FIGS. 6 and 7, if the parameter TAG1 has the value 02.

For this purpose, the command CMD4 includes, under the reference of a parameter TAG6 (e.g. possibly having the value "4F"), the application identifier AID of the profile P (or of the corresponding domain ISD-P) that is to be activated when the parameter TAG1 has the value 00 or 01.

In addition, the command CMD4 includes:

- under the reference of a parameter TAG2 (e.g. possibly being represented by the value "56"), the list LT1 of at least one identifier AID of a profile P (or of the corresponding domain ISD-P) for activating when the parameter TAG1 has the value 02. For example, each identifier AID listed is referenced under a parameter TAG8 (e.g. possibly being represented by the value "4F") and of value that represents the value of the identifier AID of the profile P (or of the corresponding domain ISD-P);
- under the reference of a parameter TAG4 (e.g. possibly being represented by the value "57"), the list LT2 of at least one identifier AID of a profile P (or of the corresponding domain ISD-P) for deactivating when the parameter TAG1 has the value 02. For example, each identifier AID listed is referenced under a parameter TAG10 (e.g. possibly being represented by the value "4F") and of value that represents the value of the identifier AID of the profile P (or of the corresponding domain ISD-P).

In a particular situation, one of the lists LT1 and LT2 is empty, and the non-empty list among LT1 and LT2 has at least two identifiers of profiles P.

As shown in FIG. 9, the command CMD5 includes a parameter DGI in the DISABLE PROFILE state indicating that the command CMD5 is to be processed as a deactivation (or hybrid) command and the parameter TAG1 indicating the mode of operation with which the command CMD5 is to be processed by the module eUICC1.

In response to the command CMD5, the module eUICC1 is configured to:

- process the command CMD5 as a deactivation command using the third mode MD3 as described above with reference to FIG. 5, if the parameter TAG1 has the value 00;
- process the command CMD5 as a deactivation command using the fourth mode MD4 as described above with reference to FIG. 5, if the parameter TAG1 has the value 01; and
- process the command CMD5 as a hybrid command using the fifth mode MD5 as described above with reference to FIGS. 6 and 7, if the parameter TAG1 has the value 02.

For this purpose, the command CMD5 includes, under the reference of a parameter TAG7 (which may for example have the value "4F"), the identifier AID of the profile P (or of the corresponding domain ISD-P) to be deactivated when the parameter TAG1 has the value 00 or 01.

In addition, the command CMD5 includes:

- under the reference of the parameter TAG2 (e.g. possibly being represented by the value "59"), the list LT1 of at least one identifier AID of a profile P (or of the corresponding domain ISD-P) for activating when the parameter TAG1 has the value 02. For example, each identifier AID in the list is referenced under a parameter TAG8 (e.g. possibly being represented by the value "4F") and of value that represents the value of the identifier AID of the profile P (or of the corresponding domain ISD-P);
- under the reference of the parameter TAG4 (e.g. possibly being represented by the value "5A"), the list LT2 of at least one identifier AID of a profile P (or of the corresponding domain ISD-P) for deactivating when the parameter TAG1 has the value 02. For example, each identifier AID in the list is referenced under a parameter TAG10 (e.g. possibly being represented by the value "4F") and of value representing the value of the identifier AID of the profile P (or of the corresponding domain ISD-P).

In a particular situation, one of the lists LT1 and LT2 is empty, and the non-empty list among LT1 and LT2 contains at least two identifiers of profiles P.

It can be understood that the implementation described above with reference to FIGS. 8 and 9 constitutes a non-limiting implementation of the invention. In a variant, the parameter TAG1 of the commands CMD4 and CMD5 may take only two of the values 00, 01, and 02 (e.g. the values 00 and 02).

The invention serves advantageously to improve the management of the states of profiles in an eUICC module, and in particular it serves to maintain a plurality of profiles active simultaneously so that it is no longer necessary to send activation and/or deactivation requests to the eUICC module each time it is necessary to use a different profile. This makes it possible to limit network traffic and resources that would otherwise be necessary for sending or managing requests to activate and deactivate profiles.

A person skilled in the art understands that the above-described embodiments and variants merely constitute non-limiting examples of how the invention may be implemented. In particular, a person skilled in the art may envisage any adaptation or combination of the above-described embodiments and variants in order to satisfy any particular need.

The invention claimed is:

1. An embedded subscriber identity module suitable for co-operating with a communications terminal, comprising:
a plurality of secondary secure domains, each of the secondary secure domains comprising a communication profile, wherein each communication profile is either active or inactive, each active communication profile allowing the communications terminal to communicate with a mobile telephone network associated with said active communication profile;
a privileged secure domain configured to control a state of each communication profile, wherein the state is active or inactive; and
a processor and a non-volatile memory comprising instructions for an operating system, wherein the instructions are executed by the processor to perform operations comprising:
receiving from a server, as an activation request, a single operation command for activating a first communication profile in the inactive state in the embedded subscriber identity module, said single operation command including at least one parameter specifying a desired mode for the embedded subscriber identity module;
configuring the embedded subscriber identity module in a first mode or in a second mode depending on a state of the at least one parameter included in the single operation command;
when a second communication profile distinct from said first communication profile is already active at the time of receiving said activation request single operation command:
and when configured in the first mode based on the at least one parameter, activating the first communication profile while simultaneously maintaining said second communication profile in the active state so that more than one communications profile is active at a same time; and
when configured in the second mode based on the at least one parameter, activating the first communication profile while deactivating each communication profile other than the first communication profile so that only the first communication profile is in the active state, wherein the first mode or the second mode are set and the first communication profile is activated while either maintaining the second communication profile active or deactivating the second communication profile, depending on whether the first mode or the second mode are set, in response to the single operation command.

2. The embedded subscriber identity module according to claim 1, wherein the communications terminal includes at least one radio interface, each active communication profile being suitable, when each active communication profile has access to said at least one radio interface, for setting up communication between the communications terminal and the mobile telephone network associated with said active communication profile.

3. The embedded subscriber identity module according to claim 1, wherein the operations further comprise:
receiving a deactivation request for deactivating the first communication profile that is already in the active state in the embedded subscriber identity module; and
configuring the embedded subscriber identity module in a third mode or in a fourth mode depending on the state of a second parameter included in said deactivation request;
wherein, when the second communication profile distinct from said first communication profile is already active on receiving said deactivation request, the embedded subscriber identity module is configured:
in the third mode, to deactivate the first communication profile while maintaining the second communication profile active; and
in the fourth mode, to activate a communication profile predefined as a profile by default and to deactivate each communication profile other than said profile by default.

4. The embedded subscriber identity module according to claim 3, wherein, in the third mode, the embedded subscriber identity module is configured, in response to the deactivation request, to maintain in the active state the second communication profile including when said second communication profile is not a communication profile defined by default in the embedded subscriber identity module.

5. The embedded subscriber identity module according to claim 1, wherein said activation request or a deactivation request are application protocol data unit (APDU) commands in compliance with the standard ISO 7816-4.

6. The embedded subscriber identity module according to claim 1, wherein the embedded subscriber identity module is suitable, in a fifth mode, for receiving a hybrid request identifying at least two communication profiles, each of the at least two communication profiles being for activating or for deactivating in said embedded subscriber identity module;
said embedded subscriber identity module being suitable, in said fifth mode for:
configuring each communication profile identified as a profile for activating in said hybrid request to the active state; and configuring each communication profile identified as a profile for deactivating in said hybrid request to the inactive state.

7. The embedded subscriber identity module according to claim 6, wherein the hybrid request identifies at least one first communication profile for activating in the embedded subscriber identity module and at least one second communication profile for deactivating in the embedded subscriber identity module.

8. The embedded subscriber identity module according to claim 6, wherein the hybrid request identifies solely at least two first communication profiles for activating or solely at least two communication profiles for deactivating in the embedded subscriber identity module.

9. The embedded subscriber identity module according to claim 6, wherein the at least one parameter includes a third parameter capable of taking a first state or a second state, and a fourth parameter capable of taking a first state, a second state, or a third state;
wherein the embedded subscriber identity module is configured:
to process the hybrid request as an activation command when the third parameter is in the first state and the second parameter is in the first or second state;
to process the hybrid request as a deactivation command when the third parameter is in the second state and the fourth parameter is in the first or second state; and
to process the hybrid request as a hybrid activation and deactivation command when the third parameter is in the first or second state and the fourth parameter is in the third state.

10. The embedded subscriber identity module according to claim 9, wherein the embedded subscriber identity module is configured to process the hybrid request:
in the first mode if the third parameter is in the first state and the fourth parameter is in the first state;
in the second mode if the third parameter is in the first state and the fourth parameter is in the second state;
in a third mode if the third parameter is in the second state and the fourth parameter is in the first state;
in a fourth mode if the third parameter is in the second state and the fourth parameter is in the second state; and
in a fifth mode if the third parameter is in the first state and the fourth parameter is in the third state, or if the third parameter is in the second state and the fourth parameter is in the third state.

11. A device suitable for communicating with a communications terminal co-operating with an embedded subscriber identity module, the device comprising:
a send module suitable for sending to the embedded subscriber identity module an activation request for activating a first communication profile that is in the inactive state in the embedded subscriber identity module, or for sending a deactivation request for deactivating a first communication profile that is already in the active state in the embedded subscriber identity module;
an insertion module suitable for including, prior to sending to the embedded subscriber identity module, one of the following:
a first parameter in the activation request; and
a second parameter in the deactivation request;
wherein:
the first parameter indicates whether the embedded subscriber identity module is to configure itself in a first mode or in a second mode when any second communication profile distinct from said first communication profile is already active in the embedded subscriber identity module on receiving said activation request, wherein:
when configured in the first mode based on the first parameter, the embedded subscriber identity module is to activate the first communication profile while maintaining said second communication profile active; and
when configured in the second mode based on the first parameter, the embedded subscriber identity module is to activate the first communication profile and to deactivate each communication profile other than the first communication profile; and wherein,
the second parameter indicates whether the embedded subscriber identity module is to configure itself in a third mode or in a fourth mode when any second communication profile distinct from said first communication profile is already active on receiving said deactivation request, wherein
when configured in the third mode based on the second parameter, the embedded subscriber identity module is to activate the first communication profile while maintaining said second communication profile active; and
when configured in the fourth mode based on the second parameter, the embedded subscriber identity module is to activate a communication profile predefined as a default profile and to deactivate each communication profile other than said default profile.

12. A system comprising:
an embedded subscriber identity module that maintains a plurality of communication profiles simultaneously in the active state, and that is configured, upon receiving an activation request to activate a communication profile, or upon receiving a deactivation request to deactivate a communication profile, to maintain any other communication profile that is already active in the embedded subscriber identity module in the active state;
a communications terminal co-operating with the embedded subscriber identity module, wherein each active communication profile allows the communications terminal to communicate with a mobile telephone network associated with the each active communication profile; and
at least one device comprising:
an insertion module that inserts:
a first parameter in the activation request; and
a second parameter in the deactivation request;
wherein:
the first parameter indicates whether the embedded subscriber identity module is to configure itself in a first mode or in a second mode when any second communication profile distinct from said first profile is already active in the embedded subscriber identity module on receiving said activation request, the first mode being configured to cause the embedded subscriber identity module to activate a first communication profile while simultaneously maintaining any other communication profile in the active state; and
the second mode being configured to cause the embedded subscriber identity module to activate the first communication profile while deactivating each second communication profile; and the second parameter indicates whether the embedded subscriber identity module is to configure itself in a third mode or in a fourth mode when any second communication profile distinct from said first profile is already active on receiving said deactivation request; and a transmitter that sends, to the embedded subscriber identity module, the activation request, or the deactivation request.

13. A control method performed by an embedded subscriber identity module suitable for co-operating with a communications terminal, said method comprising:

maintaining a plurality of communication profiles simultaneously in the active state, each active communication profile authorizing the communications terminal to communicate with a mobile telephone network associated with said each active communication profile;

on receiving a single operation command from a server, determining the single operation command to be an activation request or a deactivation request, and determining a mode of operation of the embedded subscriber identity module based on one or more values of a plurality of parameters in the single operation command;

activating a communication profile identified in the activation request, and deactivating a communication profile identified in the deactivation request, when configured in a first mode, wherein in the first mode more than one communications profile is active at a same time:

maintaining, by the embedded subscriber, any one other communication profile that is already in the active state in said embedded subscriber identity module, and, when configured in a second mode, deactivating any other communication profile that is already active in said embedded subscriber identity module already in the active state, other than the communication profile identified in the activation request, wherein the first mode or the second mode are set and the communication profile identified in the activation request is activated while either maintaining the any other communication profile active or deactivating the any other communication profile, depending on whether the first mode or the second mode are set, in response to the single operation command.

* * * * *